US007212179B2

(12) United States Patent
Seki

(10) Patent No.: US 7,212,179 B2
(45) Date of Patent: May 1, 2007

(54) LIGHT EMITTING DISPLAY DEVICE, ELECTRONIC EQUIPMENT INTO WHICH THE SAME DEVICE IS LOADED, AND DRIVE METHOD OF THE LIGHT EMITTING DISPLAY DEVICE

(75) Inventor: Shuichi Seki, Yonezawa (JP)

(73) Assignee: Tohoku Pioneer Corporation, Yamagata (JP)

( * ) Notice: Subject to any disclaimer, the term of this patent is extended or adjusted under 35 U.S.C. 154(b) by 67 days.

(21) Appl. No.: 11/208,547

(22) Filed: Aug. 23, 2005

(65) Prior Publication Data

US 2006/0055651 A1 Mar. 16, 2006

(30) Foreign Application Priority Data

Aug. 24, 2004 (JP) ............................ 2004-243131

(51) Int. Cl.
*C09G 3/30* (2006.01)
*C09G 3/10* (2006.01)

(52) U.S. Cl. ..................................... 345/76; 315/169.3

(58) Field of Classification Search ............ 315/169.1, 315/169.3; 345/76, 77, 80, 82, 84
See application file for complete search history.

(56) References Cited

U.S. PATENT DOCUMENTS 6,229,506 B1 * 5/2001 Dawson et al. ............... 345/82
7,057,588 B2 * 6/2006 Asano et al. ................. 345/76
7,109,952 B2 * 9/2006 Kwon ......................... 345/76
2005/0219170 A1 * 10/2005 Seki ............................ 345/77

FOREIGN PATENT DOCUMENTS

JP 2001-343933 12/2001

* cited by examiner

*Primary Examiner*—Thuy Vinh Tran
(74) *Attorney, Agent, or Firm*—Westerman, Hattori, Daniels & Adrian, LLP.

(57) ABSTRACT

A correction voltage retaining capacitor C2, a correction voltage write transistor Tr4, and a switching transistor Tr5 are added to a pixel structure of an SES drive method provided with an organic EL element E1 as a light emitting element, a light emission drive transistor Tr1, a data write transistor Tr2, and an erase transistor Tr3 which can erase electrical charges in a light emission maintaining capacitor C1. With the ON operation of the erase transistor Tr3, the correction voltage write transistor Tr4 is turned on, and the switching transistor Tr5 is turned off. In this state, the threshold voltage (Vth) of the light emission drive transistor Tr1 is written in the correction voltage retaining capacitor C2. When pixels are lit, by a gate-to-source voltage obtained by adding the threshold voltage written in the correction voltage retaining capacitor C2 to a data voltage written in the light emission maintaining capacitor C1, drain current of the light emission drive transistor Tr1 flows. Thus, among respective pixels, a lighting operation is performed in a state in which variations of light emission intensities caused by variations of threshold voltages of the light emission drive transistor Tr1 are restrained.

7 Claims, 4 Drawing Sheets

LIGHT EMITTING DISPLAY DEVICE, ELECTRONIC EQUIPMENT INTO WHICH THE SAME DEVICE IS LOADED, AND DRIVE METHOD OF THE LIGHT EMITTING DISPLAY DEVICE

BACKGROUND OF THE INVENTION

1. Field of the Invention

The present invention relates to a light emitting display device in which light emitting elements constituting pixels are actively driven for example by TFTs (Thin Film Transistors) and in particular to a light emitting display device which can effectively restrain intensity non-uniformity among respective pixels which occurs due to variations in characteristics of light emission drive transistors that give drive current to the respective light emitting elements.

2. Description of the Related Art

Demand for a display panel which has a high definition image display function and which can realize a thin shape and low power consumption has increased due to popularity of cellular telephones, personal digital assistants (PDAS), and the like, and conventionally a liquid crystal display panel has been adopted in many products as the one which meets the needs thereof. Meanwhile, these days a self light emitting display panel utilizing an organic EL element whose characteristic as a self light emitting type display element is best used has been manufactured, and this have attracted attention as a next generation display panel in place of the conventional liquid crystal display panel. A background thereof is that by employing, in a light emission functional layer of the element, an organic compound which enables an excellent light emission characteristic to be expected, a high efficiency and a long life which can be equal to practical use have been advanced.

The organic EL element is constructed by laminating a transparent electrode for example by ITO, a light emission functional layer, and a metallic electrode one by one basically on a transparent substrate such as glass or the like. The light emission functional layer may be a single layer of an organic light emitting layer, or a double layer structure composed of an organic positive hole transport layer and an organic light emitting layer, or a triple layer structure composed of an organic positive hole transport layer, an organic light emitting layer, and an organic electron transport layer, or a multilayer structure in which an injection layer of electron or positive hole is inserted into an appropriate portion among these layers.

The organic EL element can be electrically replaced by a structure composed of a light emitting component having a diode characteristic and a parasitic capacitance component which is connected in parallel to this light emitting component, and thus the organic EL element can be said to be a capacitive light emitting element. When a light emission drive voltage is applied to this organic EL element, at first, electrical charges corresponding to the electric capacity of this element flow into the electrode as a displacement current and are accumulated. It can be considered that when the drive voltage then exceeds a determined voltage (light emission threshold voltage=Vth) peculiar to this element, current begins to flow from one electrode (anode side of the diode component) to an organic layer constituting the light emitting layer so that the element emits light at an intensity proportional to this current.

As a display panel employing such organic EL elements, a passive matrix type display panel in which EL elements are simply arranged in a matrix pattern and an active matrix type display panel in which active elements for example constituted by TFTs are added to respective EL elements arranged in a matrix pattern have been proposed. The latter active matrix type display panel can realize low power consumption compared to the former passive matrix type display panel and has a characteristic that crosstalk among pixels is small, whereby it is particularly suitable for a high definition display constituting a large screen.

FIG. 1 shows an example of a circuit structure corresponding to one pixel 10 in an active matrix type display panel already proposed. The circuit structure of the pixel 10 shown in this FIG. 1 shows an example in which a lighting drive method called the SES (Simultaneous Erasing Scan) method which realizes time division gradation expression is adopted.

In the structure of this pixel 10, a data signal Vdata corresponding to a video signal supplied from a data driver 11 is supplied to source S of a scan selection transistor, that is, a data write transistor Tr2, via a data line arranged in a display panel. A data write signal Write is supplied from a scan driver 12 to the gate G of the data write transistor Tr2 via a scan selection line.

The drain D of the data write transistor Tr2 is connected to gate G of a light emission drive transistor Tr1 and to one terminal of a light emission maintaining capacitor C1. The source S of the light emission drive transistor Tr1 is connected to the other terminal of the capacitor C1 and to an anode side drive power source Va. Further, the drain D of the light emission drive transistor Tr1 is connected to anode terminal of an organic EL element E1 provided as a light emitting element, and cathode terminal of this organic EL element E1 is connected to a cathode side drive power source Vc.

The pixel structure shown in FIG. 1 is provided with an erase transistor Tr3, and an erase signal Erase is supplied from an erase driver 13 to the gate of this erase transistor Tr3 via an erase signal line. The source S and drain D of the erase transistor Tr3 are connected to end portions of the light emission maintaining capacitor C1, respectively.

In the pixel 10 shown in FIG. 1, only the light emission drive transistor Tr1 is constituted by p-channel type TFT, and other transistors are constituted by n-channel type TFTs. A large number of the pixels 10 of the above-described structure are arranged in a matrix pattern in a row direction and a column direction to construct the display panel.

In the structure of the pixel 10 shown in FIG. 1, an ON voltage Write as a scan signal is supplied from the scan driver 12 to the gate of the data write transistor Tr2 during an address period. Thus, current corresponding to the data signal Vdata supplied from the data driver 11 flows in the light emission maintaining capacitor C1 via the source and drain of the data write transistor Tr2 so that the capacitor C1 is charged. Its charge voltage is supplied to the gate of the light emission drive transistor Tr1, and the transistor Tr1 allows drain current Id corresponding to a gate-to-source voltage (Vgs) which is based on the gate voltage thereof and on the drive power source Va supplied to the source to flow in the EL element E1, whereby the EL element E1 emits light.

When the gate of the data write transistor Tr2 becomes an OFF voltage after the address period elapses, the transistor Tr2 becomes in a so-called cut-off state. However, the gate voltage of the light emission drive transistor Tr1 is maintained by electrical charges accumulated in the capacitor C1, and thus drive current to the EL element E1 is retained. Accordingly, a lighting state of the EL element E1 which corresponds to the data signal Vdata can be continued until a period to a next address operation (for example, a next one frame period or a next one subframe period).

Meanwhile, in the middle of the lighting period of the EL element E1 (for example, in the middle of one frame period or one subframe period), the erase signal Erase which turns the erase transistor Tr3 on is supplied from the erase driver 13. In the case where this erase transistor Tr3 is turned on, electrical charges charged in the capacitor C1 are erased (charged) instantly, and as a result, the, light emission drive transistor Tr1 becomes in the cut-off state, whereby the EL element E1 is instantly extinguished.

In other words, by controlling output timing of the gate-on voltage supplied from the erase driver 13, the lighting period of the EL element E1 for example during one frame or one subframe period is controlled, and thus multi-gradation expression can be realized. The structure of a pixel provided with the erase transistor Tr3 in addition to the data write transistor Tr2 and the light emission drive transistor Tr1 as described above is disclosed in the following Japanese Patent Application Laid-open No. 2001-343933.

In many of these types of light emitting elements represented by the organic EL element have a current dependency that the light emission intensity is determined in response to the drive current. Meanwhile, regarding the light emission drive transistor employed in the above-described pixel structure, variations occurs in the characteristic of drain current Id with respect to the gate-to-source voltage Vgs, particularly in the characteristic of the gate-to-source voltage Vgs, that is, of the threshold, at which the drain current Id begins to flow. Thus, even though the same level of data signal Vdata is supplied, variations in light emission intensities occur among pixels.

Such variations in light emission intensities among pixels allow, particularly when an animation image and the like is reproduced, a vague stripe pattern or a phenomenon resembling flicker to be generated, thereby causing a problem that display quality is considerably degraded. Thus, in order to solve the problem, it is necessary to make the characteristic of TFTs formed in a display panel uniform, and regarding this, conventionally, various discussions and developments have been carried out. However, regarding this, there exist a number of technical problems including a problem of selection of a semiconductor material or other materials, a problem of a manufacturing process, a problem of a manufacturing environment, and the like, and it is difficult to pursue a fundamental solution.

SUMMARY OF THE INVENTION

The present invention has been developed based on the above-described technical viewpoint, and it is an object of the present invention to provide a light emitting display device equipped with pixel circuits which can suppress variations of light emission intensities generated among pixels by correcting threshold characteristics of light emission drive transistors constituting light emitting pixels within respective pixels, and particularly to provide a light emitting display device equipped with the pixel circuits which can be appropriately adopted in a structure of the SES method already described and the drive method thereof.

A light emitting display device according to the present invention which has been developed in order to solve the problem is a light emitting display device in which a large number of pixels are arranged, said pixel having a structure comprising a data write transistor which charges a light emission maintaining capacitor in accordance with a data signal, a light emission drive transistor which supplies drive current to a light emitting element based on the voltage charged in said light emission maintaining capacitor, and an erase transistor which can discharge the charge voltage charged in said light emission maintaining capacitor, characterized by further comprising a correction voltage write transistor which short circuits a gate and a drain of said light emission drive transistor at a timing at which said erase transistor is turned on and a correction voltage retaining capacitor in which a threshold voltage generated between the gate and a source of said light emission drive transistor is written by a short circuit operation of said correction voltage write transistor, and characterized by being constructed in such a way that said light emission drive transistor supplies the drive current to said light emitting element based on both charge voltages charged in said light emission maintaining capacitor and said correction voltage retaining capacitor.

A drive method of a light emitting display device according to the present invention which has been developed in order to solve the problem is a drive method of a light emitting display device in which a large number of pixels are arranged, said pixel having a structure comprising a data write transistor which charges a light emission maintaining capacitor in accordance with a data signal, a light emission drive transistor which supplies drive current to a light emitting element based on the voltage charged in said light emission maintaining capacitor, and an erase transistor which can discharge the charge voltage charged in said light emission maintaining capacitor, characterized by sequentially repeatedly performing a first step of short-circuiting a gate and a drain of said light emission drive transistor at a timing at which said erase transistor is turned on so as to allow a threshold voltage generated between the gate and a source of said light emission drive transistor to be written in a correction voltage retaining capacitor, and a second step of supplying light emission drive current to said light emitting element by said light emission drive transistor based on said threshold voltage written in said correction voltage retaining capacitor and a voltage charged in the light emission maintaining capacitor in accordance with said data signal.

DESCRIPTION OF THE PREFERRED EMBODIMENT

Figure 2:
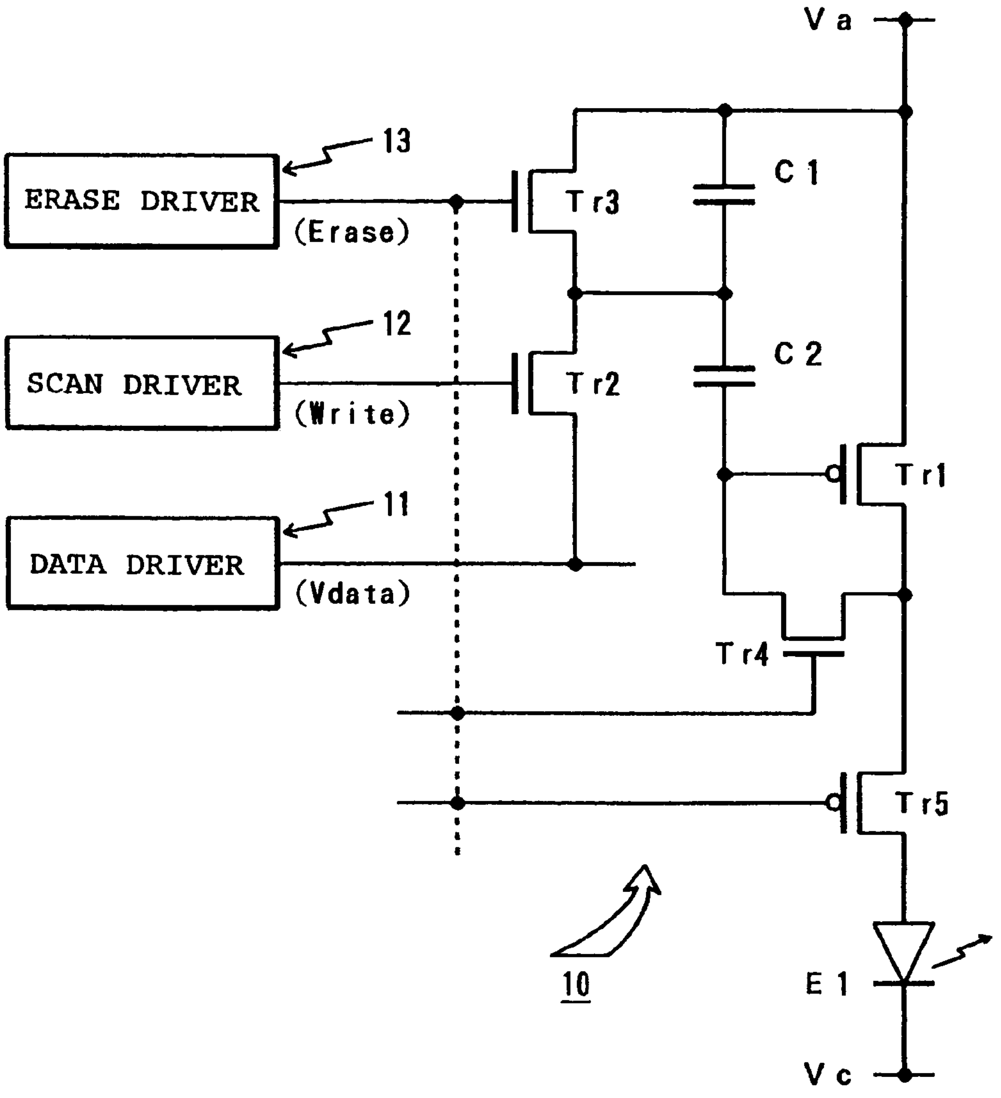
FIG. 2 is a circuit structure diagram showing an example of a pixel structure adopted in a light emitting display device according to the present invention.
Figure 3:
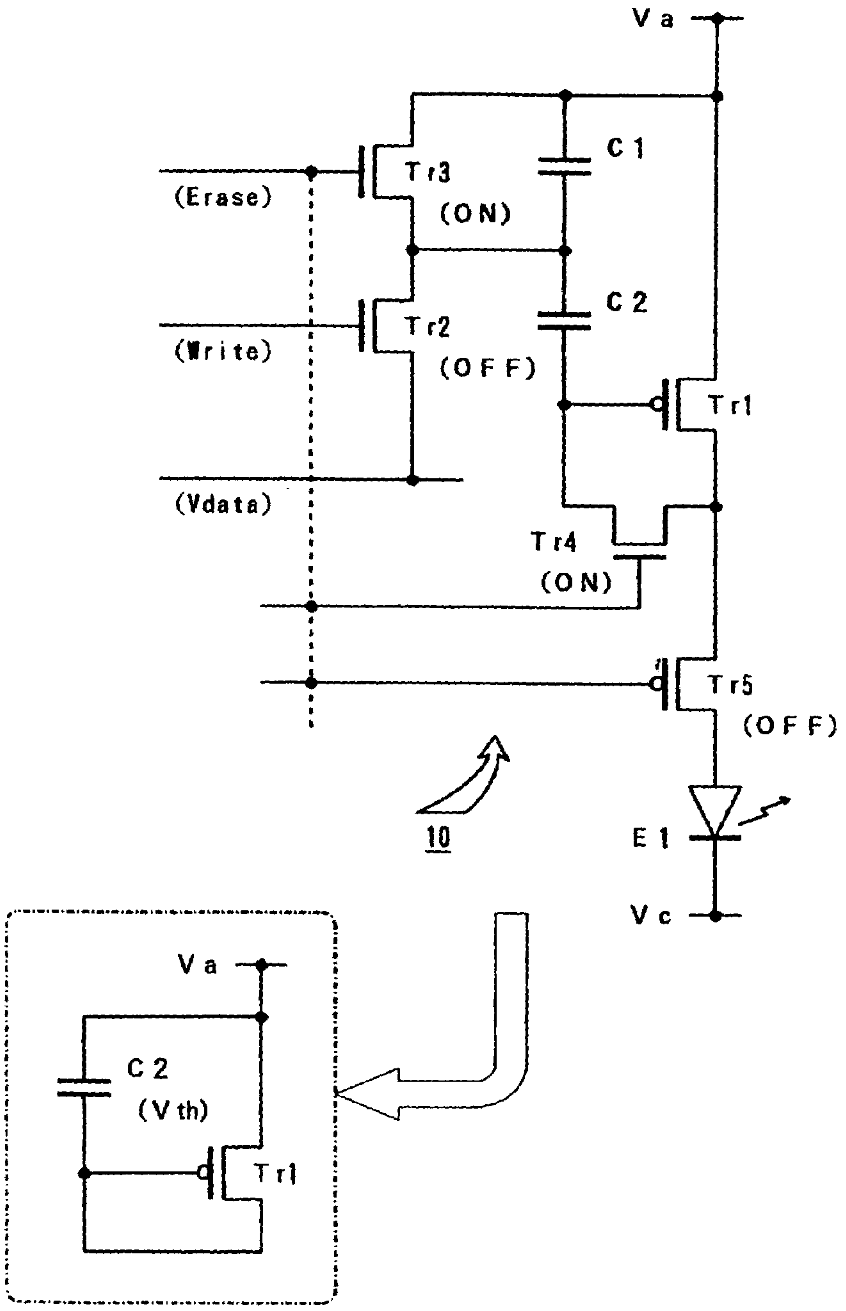
FIG. 3 is a view explaining a state in which a correction voltage is written in the pixel structure shown in FIG. 2.
Figure 4:
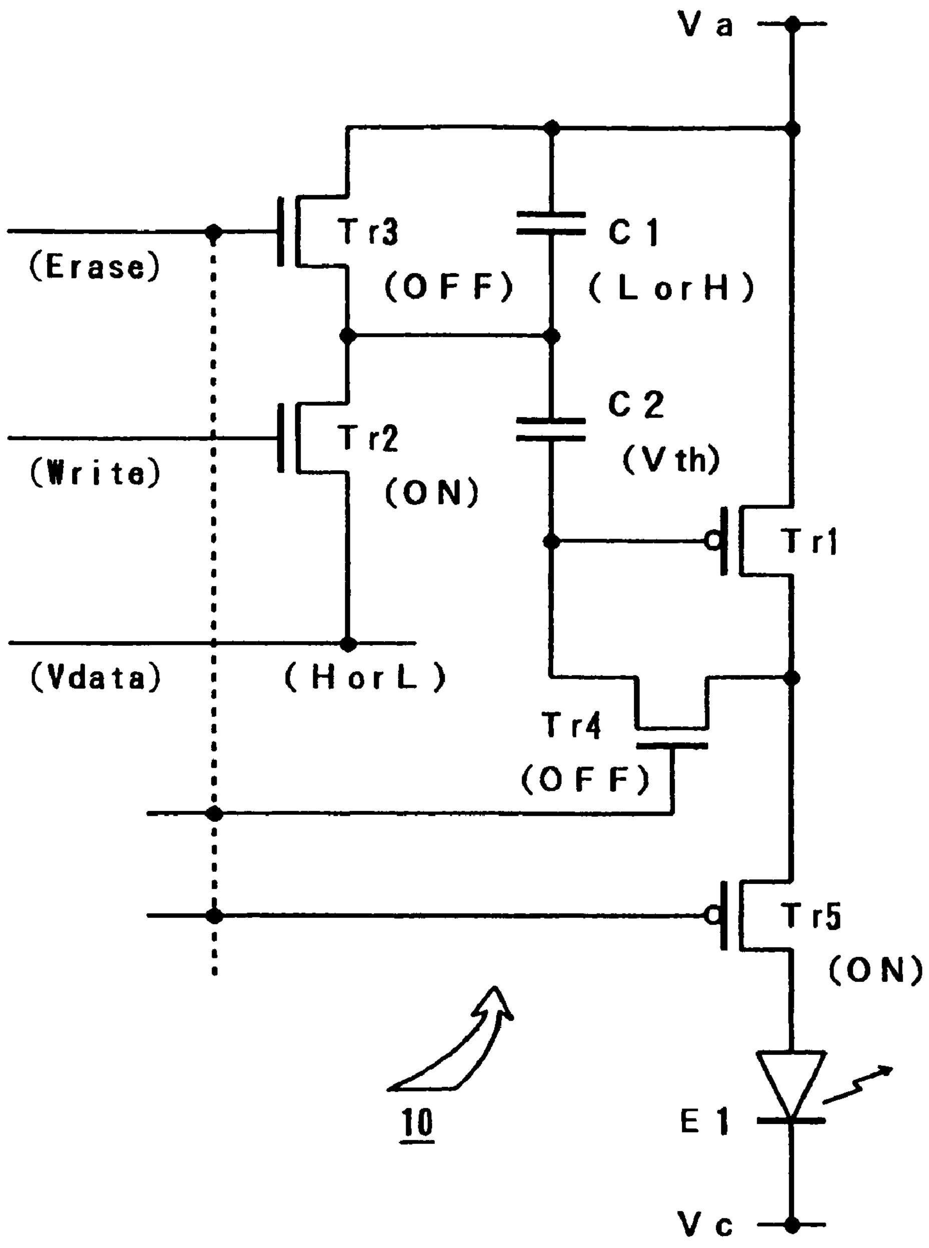
FIG. 4 is a view explaining a state in which data writing is performed in the pixel structure shown in FIG. 2 similarly.

A light emitting display device and the drive method thereof according to the present invention will be described below based on an embodiment shown in the drawings. Any of FIGS. 2–4 show an embodiment of a light emitting display device according to the present invention, and FIG. 2 explains a structure of one pixel 10. FIG. 3 explains a state in which a correction voltage is written in the same pixel structure, and further FIG. 4 shows a state in which data writing is performed in the same pixel structure and shows a state which follows this and in which an EL element as a light emitting element is driven to emit light.

Figure 1:
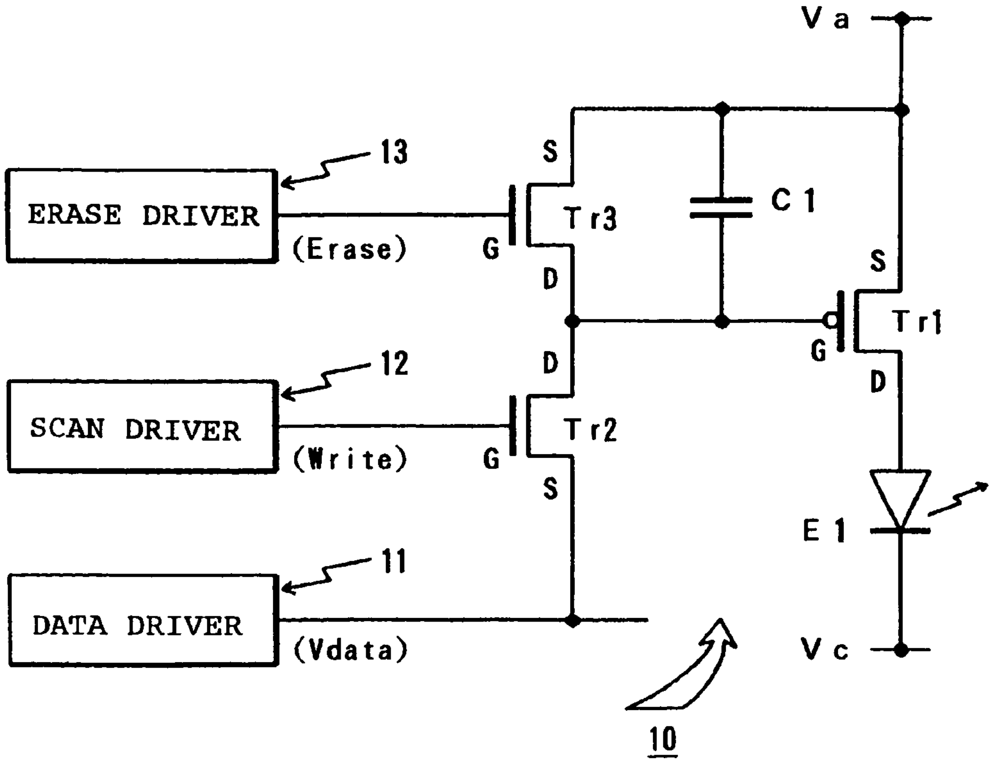
FIG. 1 is a circuit structure diagram showing a pixel structure of a conventional SES drive method.

First, in the structure shown in FIG. 2, the respective data driver 11, scan driver 12, erase driver 13, light emission drive transistor Tr1, data write transistor Tr2, erase transistor Tr3, light emission maintaining capacitor C1, organic EL element E1 as a light emitting element, anode side drive power source Va, and cathode side drive power source Vc perform the same functions as those of the respective constituent components shown in FIG. 1 already described. Therefore, respective description thereof will be omitted.

In the structure of the pixel 10 shown in FIG. 2, a correction voltage retaining capacitor C2 lies between the drain of the erase transistor Tr3, that is, one terminal of the light emission maintaining capacitor C1, and the gate of the light emission drive transistor Tr1. In the structure shown in FIG. 2, drain and source of a correction voltage write transistor Tr4 constituted by an n-channel type TFT are connected between the gate and the drain of the light emission drive transistor Tr1.

Further, in the pixel structure shown in FIG. 2, source and drain of a switching transistor Tr5 constituted by a p-channel type TFT are connected in series between the drain of the light emission drive transistor Tr1 and the anode terminal of the EL element. The gate of the correction voltage write transistor Tr4 and the gate of the switching transistor Tr5 are commonly connected to the gate of the erase transistor Tr3 preferably as shown by the broken line, and are respectively given ON/OFF control by the erase signal Erase provided from the erase driver 13.

That is, the erase transistor Tr3 and the correction voltage write transistor Tr4 constituted by n-channel type TFTs are both brought to an ON state in a state in which the erase signal Erase provided from the erase driver 13 is at level "H." At this time, the switching transistor Tr5 constituted by a p-channel type TFT is brought to an OFF state. In a state in which the erase signal Erase is at level "L," the erase transistor Tr3 and the correction voltage write transistor Tr4 are both brought to the OFF state, and the switching transistor Tr5 is brought to the ON state.

FIG. 3 explains a state in which a correction voltage is written as described earlier, and in this case, the erase signal Erase from the erase driver is brought to the level "H." Further, in this state, the data write signal Write from the scan driver is brought to the state of the level "L." Accordingly, the erase transistor Tr3 and the correction voltage write transistor Tr4 are both brought to the ON state, and the data write transistor Tr2 and the switching transistor Tr5 are both brought to the OFF state.

Thus, the end portions of the light emission maintaining capacitor C1 are short circuited by the erase transistor Tr3, so that one end of the correction voltage retaining capacitor C2 is connected to the anode side drive power source Va. In other words, the respective terminals of the correction voltage retaining capacitor C2 are connected to the gate and source of the light emission drive transistor Tr1, respectively. At this time, the gate and the drain of the light emission drive transistor Tr1 are short circuited by the correction voltage write transistor Tr4. Accordingly, the correction voltage retaining capacitor C2 and the light emission drive transistor Tr1 are brought to the state of an equivalent circuit enclosed by the broken line on a lower left of FIG. 3.

As can be understood from the equivalent circuit, the threshold voltage (Vth) in the light emission drive transistor Tr1 is written in the correction voltage retaining capacitor C2. In this state, since the light emission drive transistor Tr1 is brought to a bias state in which slightly drain current starts to flow therein, the switching transistor Tr5 is brought to OFF as described above so as to prevent the drain current from being supplied to the EL element E1 provided as a light emitting element.

FIG. 4 shows a state in which data writing is performed, and in this state the erase signal Erase from the erase driver is brought to the level "L." Further, in this state, the data write signal Write from the scan driver is brought to the state of the level "H." Accordingly, the erase transistor Tr3 and the correction voltage write transistor Tr4 are both brought to the OFF state, and the data write transistor Tr2 and the switching transistor Tr5 are both brought to the ON state.

At this time, in the case where pixels are controlled for being lit, the level "H" is supplied from the data driver as the data signal Vdata, and in the case where pixels are controlled for being extinguished, the level "L" is supplied. Accordingly, the terminal voltage of the maintaining capacitor C1, that is, the electrical potential of the connection point between the capacitor C1 and the correction voltage retaining capacitor C2, is brought to the level "L" in the case where the pixels are lit and is brought to the level "H" in the case where the pixels are extinguished.

Here, for example, in the case where the pixels are lit, the threshold voltage (Vth) of the light emission drive transistor written in the correction voltage retaining capacitor C2 is added to the terminal voltage of the level "L" written in the light emission maintaining capacitor C1, so that this is supplied between the gate and source of the light emission drive transistor Tr1.

That is, by allowing the threshold voltage (Vth) to be added to a data voltage written in the light emission maintaining capacitor C1, a data voltage through which variations in respective threshold voltages of the light emission drive transistors Tr1 are corrected is supplied between the gate and source of the light emission drive transistor Tr1.

Accordingly, even when there exist variations in the threshold voltages of the light emission drive transistors Tr1, respective pixels perform lighting operations of respective EL elements E1 in accordance with the data voltages written in the light emission maintaining capacitors C1. Thus, the lighting operations are performed in a state in which variations in light emission intensities caused by variations in the threshold voltages of the light emission drive transistors are suppressed among respective pixels.

In addition to this, in this embodiment, as already described, for example in the middle of one frame period or one subframe period, the erase signal Erase for turning the erase transistor Tr3 on is supplied from the erase driver, and thus multi-gradation expression can be realized. In this manner, at the timing at which the erase transistor Tr3 is turned on, as described with reference to FIG. 3, the operation of writing the threshold voltage of the light emission drive transistor in the correction voltage retaining capacitor C2 is performed once again. Then, by repeating of the operations described with reference to FIGS. 3 and 4, the lighting operation for the pixels is continued.

As is apparent from the description above, with the light emitting display device and the drive method thereof according to the present invention, since variations in the threshold voltages of the light emission drive transistors can be corrected, occurrences of variations of light emission intensities among respective pixels can be effectively restrained. Thus, a problem that a vague stripe pattern or a phenomenon resembling flicker is generated, causing considerable deterioration in display quality, can be resolved.

In the case where the present invention is adopted in the pixel structure of the SES drive method shown as an embodiment, it is not necessary to specially dispose a signal line for controlling the gate voltages of the correction voltage write transistor and the switching transistor. Further, since the writing operation of the threshold voltage can be performed for the correction voltage retaining capacitor at the same time as an erasing operation of electrical charges of the light emission maintaining capacitor by the erase transistor, the operation is rational, and the lighting control of the pixels can be performed easily.

Although organic EL elements are employed as light emitting elements in the embodiment described above, this light emitting element is not limited to the organic EL element, and even in a case where a current-dependent light emitting element whose light emission intensity is determined in response to drive current is utilized, operations and effects similar to those in the above can be obtained. By adopting the above-described light emitting display device in a variety of electronic equipment calling for this type of display device other than the cellular telephones or portable information terminal described in the opening, the operations and effects already described can be produced as they are.

What is claimed is:

1. A light emitting display device in which a large number of pixels are arranged, said pixel having a structure comprising a data write transistor which charges a light emission maintaining capacitor in accordance with a data signal, a light emission drive transistor which supplies drive current to a light emitting element based on the voltage charged in said light emission maintaining capacitor, and an erase transistor which can discharge the charge voltage charged in said light emission maintaining capacitor, characterized by further comprising a correction voltage write transistor which short circuits a gate and a drain of said light emission drive transistor at a timing at which said erase transistor is turned on and a correction voltage retaining capacitor in which a threshold voltage generated between the gate and a source of said light emission drive transistor is written by a short circuit operation of said correction voltage write transistor, and characterized by being constructed in such a way that said light emission drive transistor supplies the drive current to said light emitting element based on both charge voltages charged in said light emission maintaining capacitor and said correction voltage retaining capacitor.

2. The light emitting display device according to claim 1, wherein a switching transistor is connected in series between said light emission drive transistor and the light emitting element, and said switching transistor is controlled to be in a cut-off state in a state in which said correction voltage write transistor short-circuits the gate and the drain of said light emission drive transistor.

3. The light emitting display device according to claim 2, wherein said erase transistor and the correction voltage write transistor are constituted by TFTs of a same channel, said switching transistor is constituted by a TFT of the channel which is different from that of the former two TFTs, and respective gates of said erase transistor, said correction voltage write transistor, and said switching transistor are commonly connected.

4. The light emitting display device according to any one of claims 1 to 3, wherein said light emitting element is constituted by an organic EL element having at least one or more of light emission functional layers.

5. Electronic equipment into which the light emitting display device according to claim 1 is loaded.

6. A drive method of a light emitting display device in which a large number of pixels are arranged, said pixel having a structure comprising a data write transistor which charges a light emission maintaining capacitor in accordance with a data signal, a light emission drive transistor which supplies drive current to a light emitting element based on the voltage charged in said light emission maintaining capacitor, and an erase transistor which can discharge the charge voltage charged in said light emission maintaining capacitor, characterized by sequentially repeatedly performing a first step of short-circuiting a gate and a drain of said light emission drive transistor at a timing at which said erase transistor is turned on so as to allow a threshold voltage generated between the gate and a source of said light emission drive transistor to be written in a correction voltage retaining capacitor, and a second step of supplying light emission drive current to said light emitting element by said light emission drive transistor based on said threshold voltage written in said correction voltage retaining capacitor and a voltage charged in the light emission maintaining capacitor in accordance with said data signal.

7. The drive method of the light emitting display device according to claim 6, wherein at a timing at which said erase transistor is turned on, the gate and the drain of said light emission drive transistor are short-circuited by a correction voltage write transistor so as to allow said threshold voltage to be written in the correction voltage retaining capacitor, and a switching transistor which is connected in series between said light emission drive transistor and the light emitting element is controlled to be in a cut-off state.

* * * * *